United States Patent
Patterson et al.

(10) Patent No.: US 6,807,997 B2
(45) Date of Patent: Oct. 26, 2004

(54) TIRE BEAD WITH TEXTILE PLIES

(75) Inventors: Forrest Patterson, Chatel-Guyon (FR); Michel Ahouanto, Enval (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 253 days.

(21) Appl. No.: 10/216,527

(22) Filed: Aug. 9, 2002

(65) Prior Publication Data

US 2003/0034108 A1 Feb. 20, 2003

Related U.S. Application Data

(63) Continuation of application No. PCT/EP01/01139, filed on Feb. 2, 2001.

(30) Foreign Application Priority Data

Feb. 10, 2000 (FR) .............................. 00 01686

(51) Int. Cl.⁷ ...................... B60C 15/02; B60C 15/04; B60C 15/06
(52) U.S. Cl. ...................... 152/540; 152/542; 152/543; 152/547
(58) Field of Search ............................ 152/540, 542, 152/543, 547

(56) References Cited

U.S. PATENT DOCUMENTS

| 5,702,548 | A | 12/1997 | Arnaud et al. |
| 5,961,756 | A | 10/1999 | Ahouanto et al. |
| 6,093,267 | A | 7/2000 | Arnaud et al. |
| 6,425,429 | B1 | 7/2002 | Arnaud et al. |
| 6,505,663 | B2 * | 1/2003 | Ahouanto et al. .......... 152/542 |

FOREIGN PATENT DOCUMENTS

| AU | 697815 | 10/1998 |
| EP | 0672547 | 9/1995 |
| EP | 0823341 | 2/1998 |

OTHER PUBLICATIONS

Patent Abstract of Japan Publication No. 06064411, Mar. 8, 1994 and JP 06064411.
Patent Abstract of Japan Publication No. 09195189, Jul. 29, 1997 and JP 09195189.

\* cited by examiner

*Primary Examiner*—Adrienne C. Johnstone
(74) *Attorney, Agent, or Firm*—Burns, Doane, Swecker & Mathis, L.L.P.

(57) ABSTRACT

A tire has a carcass reinforcement ply, anchored within each bead by winding around an annular element whose tensile strength is less than the tensile strength necessary for a bead wire of a conventional tire of the same dimension, and an assembly of at least two textile bead reinforcement layers arranged in contact with the annular element, wherein the annular element has a tensile strength of between 3 and 5 times the tension imparted to the carcass reinforcement by the recommended inflation pressure, and an elongation at break between 2 and 6%, all the reinforcement layers having a tensile strength of between 0.5 and 1 time the tensile strength of the annular element, and the total of the tensile strengths of the annular element and of the assembly of the reinforcement layers being between 6 and 8 times the tension imparted to the carcass reinforcement.

5 Claims, 2 Drawing Sheets

TIRE BEAD WITH TEXTILE PLIES

CROSS-REFERENCE TO RELATED APPLICATIONS

This application is a continuation of international application Serial No. PCT/EP01/01139, filed Feb. 2, 2001 and published as WO 01/58704 in French on Aug. 16, 2001.

BACKGROUND OF THE INVENTION

The present invention relates to a tire having a radial carcass reinforcement, and more particularly to the constitution of the beads of such tires.

European Patent EP 0823341 describes a tire comprising a crown reinforcement surmounted by a tread, two beads and at least one radial carcass ply extending from one bead to the other. Each bead of said tire has the following characteristics:

1) it is devoid of bead wire, in the sense that the person skilled in the art understands "bead wire" to mean a reinforcing element which generally fulfills the two functions of anchoring the carcass reinforcement at a given inflation pressure and of clamping the beads on the rim;
2) it comprises an annular element, the ultimate tensile strength of which in the longitudinal direction is significantly less than that which would be necessary for a conventional bead wire used in a tire of the same dimension, but which is however sufficient to permit the operations of building, turning-up, shaping and vulcanization which are effected during the manufacture of the tire;
3) the mechanical strength necessary for anchoring the carcass reinforcement is generally provided by two layers referred to as bead reinforcement layers, arranged in contact with the annular element, or close to said element, said reinforcement layers each comprising reinforcing elements which are parallel to each other within each layer and are crossed from one layer to the next, forming an angle greater than 0° and at most equal to 10° with the circumferential direction.

The beads of the tire which are thus formed make it possible to use a mix of low hysteresis loss and lesser thickness as axially outer and radially inner rubber layer intended to provide the connection to the mounting rim. The result is a reduction in weight of the tire, and a significant reduction in the rolling resistance while keeping the speed and endurance properties at a high level.

Nevertheless, the tires in question do not have perfect ability to be mounted on a rim regularly over time: many tires mount easily and correctly, whereas some tires which are allegedly identical have mounting defects which have to be corrected.

SUMMARY OF THE INVENTION

In order to overcome these drawbacks, the invention proposes a better distribution of the tensile strengths of the elements which constitute the bead. Thus the tire, according to the invention, comprises a crown reinforcement surmounted by a tread, said tread being joined by means of two sidewalls to two beads, between which extends at least one carcass reinforcement ply, anchored within each bead by winding around an annular element, the tensile strength of which is less than the tensile strength of a bead wire of a conventional tire of the same dimension, and an assembly of at least two bead reinforcement layers which are arranged in contact with the annular element and are composed of reinforcing elements which are parallel to each other within each layer and are crossed from one layer to the next, forming an angle $\alpha$ satisfying the relationship $0° < \alpha \leq 15°$ with the circumferential direction. It is characterized in that the annular element has a tensile strength of between 3 and 5 times the tension imparted to the carcass reinforcement by the recommended inflation pressure, and the elongation at break of which is between 2 and 6%, all the bead reinforcement layers having a tensile strength of between 0.5 and 1 times the tensile strength of the annular element, and the total of the tensile strengths of the annular element and the assembly of the reinforcement layers being between 6 and 8 times the tension imparted to the carcass reinforcement.

"Tension imparted to the carcass reinforcement by the recommended pressure" is to be understood to mean the tension calculated per unit of length exerted in the plane of the bead wire.

The annular element is preferably metallic and more particularly made of steel, whereas the bead reinforcement layers are advantageously formed of cables of aromatic polyamide in order to permit the lesser weight, two reinforcement layers possibly being the two strands of a ply which is turned up about the annular element, or possibly being two axially adjacent plies.

"Tensile strength" of an assembly of layers is to be understood to mean the ultimate strength obtained by traction exerted on a sample of all the layers which is taken from the new, vulcanized tire, which traction is exerted along an axis corresponding to the circumferential direction of said tire.

As is known, the layer of rubber mix arranged axially and radially to the outside of the bead and intended to provide the connection with the rim preferably has a thickness of at most 2 mm, and the rubber mix of which it is composed a modulus of elastic loss G" less than 1, G" being expressed in MPa (megapascals), and G" being measured at 10% shear, at 50° C. and at a frequency of 10 Hz.

BRIEF DESCRIPTION OF THE DRAWINGS

The characteristics of the invention will be better understood with reference to the following description, which refers to the drawings, which illustrate examples of embodiments in a non-limitative manner, and in which.

DETAILED DESCRIPTION OF THE PREFERRED EMBODIMENTS

Figure 1:
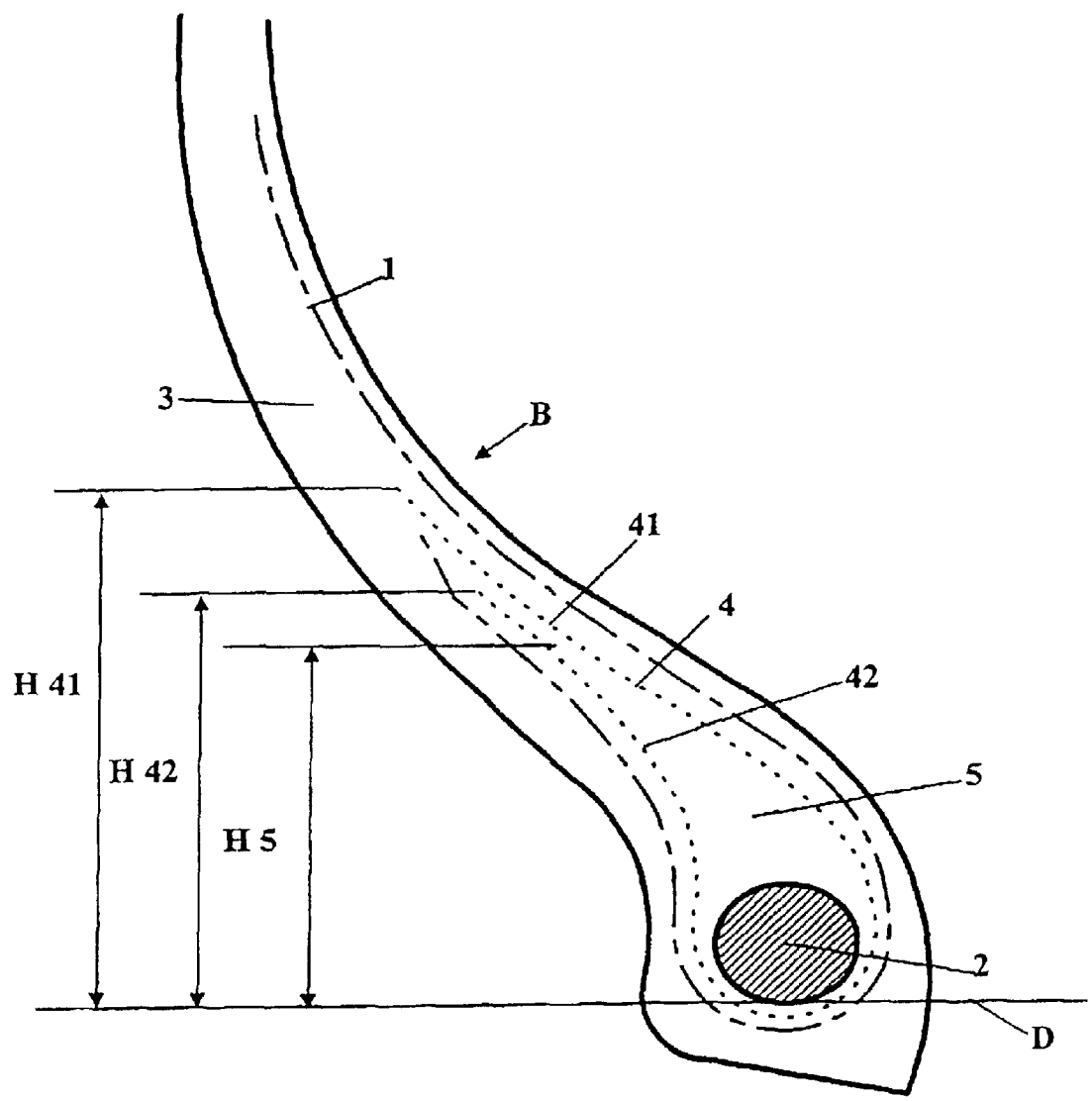
FIG. 1 is a diagram of a first variant of a bead according to the invention.

In FIG. 1, the tire according to the invention, viewed in a meridian section, comprises a crown reinforcement surmounted by a tread (not shown). The tread is joined to each bead B by a sidewall (3) reinforced by a radial carcass ply (1) which extends continuously from one bead B to the other. Around the annular element (2) there is wound, in the case of the first variant shown in FIG. 1, a bead reinforcement ply (4) to form two strands (41) and (42), which are formed of reinforcing elements of aromatic polyamide, which are parallel to each other within each strand but crossed from one strand (41) to the other (42), forming an angle $\alpha$ equal to 5° with the circumferential direction. The ends of the two strands (41) and (42) are located at different heights H41 and H42, said heights being measured on lines perpendicular to a straight line parallel to the axis of rotation of the tire passing through that point of the annular element (2) which is closest to said axis of rotation, said straight line being referred to as reference straight line D. In FIG. 1, the height H41 is greater than the height H42, but the converse, that is to say H42 greater than H41, also yields good results. Between the two strands (41) and (42) and radially above the annular element (2) there is arranged a profiled element of rubber mix (5) in the form of a substantially triangular wedge, the radially upper end of which is located at a distance H5 from the reference straight line D. Although it exists in the example described, said wedge-shaped profiled element (5) is not obligatory, and the upturned strand (42) of the reinforcement ply (4) may be directly applied to the strand (41) without the presence of the profiled element (5).

The annular element (2) has a tensile strength, measured in the circumferential direction, which is significantly less than that which would be necessary for a bead wire in a tire of the same dimension, but on the other hand very much greater than the tensile strength of the annular element described in the application cited in the preamble. For the dimension 175/70.R.13 which is more precisely concerned here, whereas the metal bead wire of the conventional tire has a tensile strength of the order of 2,000 daN, and whereas the annular element of the application referred to has a tensile strength, measured under the same conditions, of the order of 200 daN, the annular element (2) of the tire according to the invention has a tensile strength of the order of 1,000 daN. Said annular element (2) is formed of 7 elementary wires of a diameter substantially equal to 1 millimeter which are braided together. Said wires, after appropriate heat treatment, for example described in patent EP 611 669 to which reference is made, have the special feature of having a high elongation, of the order of 6%, greater than the elongations normally obtained with conventional steel wires, and their use in the annular element (2) in question of 'braided' type enables the latter to become elongated by the order of 2%. The increase in tensile strength and consequently the increase in the material and wires used in the annular element (2) makes it possible to have strengths of said element under the action of circumferential bending and of bending perpendicular to the plane of the element which are sufficient to distinctly improve or even dispense with defective mounting of the tire, because the true cause of defects in mounting ability demonstrated by the inventors is in fact the lack of rigidity under bending stresses of an annular element of inadequate tensile strength.

In the case of an annular element of "stack" type (wire wound in a helix over several layers until the element is obtained), it is possible to obtain with said wires of high elongation a bead wire elongation of the order of 4%.

Said high elongation permits better effectiveness of the presence of bead reinforcement plies in their function of taking up the stresses imposed on the carcass ply (1) under the action of the inflation pressure. Whereas the bead reinforcement ply (plies) absorb(s) the very major part of the stresses in the case of using an annular element of very low tensile strength, said stresses are better distributed in the present invention. A distribution of this type has the advantage of having an effect on the stresses to which the reinforcing elements of the bead plies are subjected: whereas in the case in which the reinforcement plies absorb virtually all the stresses, it is mainly the reinforcing elements located close to the annular element which are adversely affected; such is not the case with the tire according to the invention.

Figure 2:
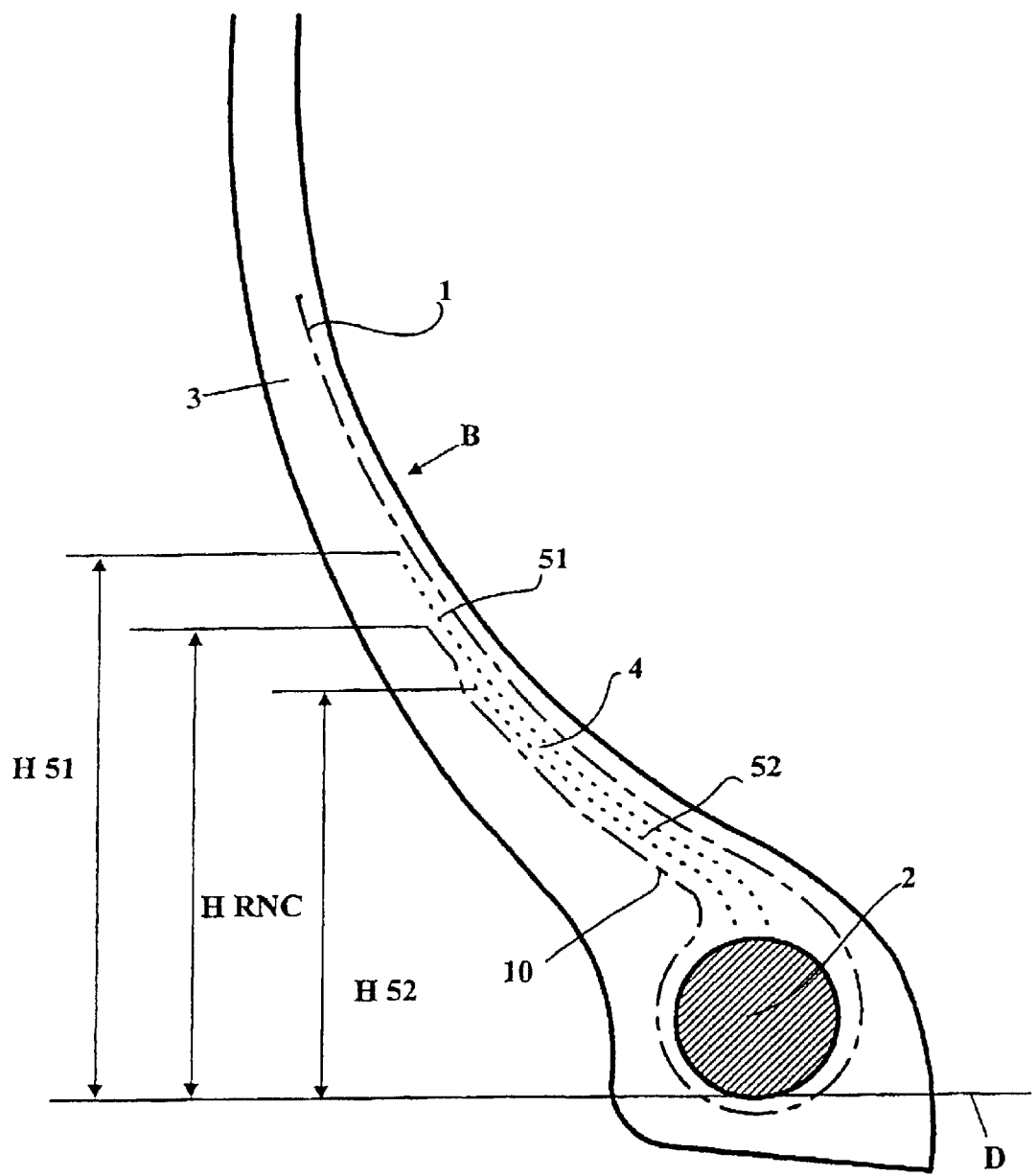
FIG. 2 shows a second variant in the same manner.

In FIG. 2, the reinforcement ply (4) turned up around the annular element (2) is replaced by two reinforcement plies (51) and (52), the radially inner ends of which are in contact with the annular element (2), and the radially outer ends of which are located at radial distances H51 and H52 from the reference straight line D, which distances are equal respectively to the distances H41 and H42 mentioned previously. It does not constitute a departure from the scope of the invention if the radial distances H51 and H52 are respectively equal to H42 and H41, which make the axially outer ply (52) longer than the axially inner ply (51), whereas the example of FIG. 1 shows an axially outer strand (42) which is shorter than the axially inner strand (41). Formed of the same reinforcing elements as the strands of the previous example, the reinforcement plies (51) and (52) are axially adjacent to each other and axially adjacent on one hand to the main part of the carcass ply (1) and on the other hand to the upturn (10) of said ply (1), which upturn is placed next to the axially outer ply (52). Said upturn (10) has a height HRNC greater than the height of the radially upper end of the shortest reinforcement ply, but less than the height of the end of the largest reinforcement ply.

We claim:

1. A tire comprising a crown reinforcement surmounted by a tread, said tread being joined by means of two sidewalls to two beads, between which extends at least one carcass reinforcement ply, anchored within each bead by winding around an annular element, the tensile strength of which is less than the tensile strength necessary for a bead wire of a conventional tire of the same dimension, and an assembly of at least two bead reinforcement layers which are arranged in contact with the annular element and composed of reinforcing elements which are parallel to each other within each layer and are crossed from one layer to the next, forming an angle with the circumferential direction and greater than 0 and greater than or equal to 15°, wherein the annular element has a tensile strength of between 3 and 5 times the tension imparted to the carcass reinforcement by the recommended inflation pressure, and an elongation at break between 2 and 6%, all the bead reinforcement layers having a tensile strength of between 0.5 and 1 time the tensile strength of the annular element, and the total of the tensile strengths of the annular element and of the assembly of the reinforcement layers being between 6 and 8 times the tension imparted to the carcass reinforcement.

2. The tire according to claim 1, wherein the bead reinforcement layers are formed of cables of aromatic polyamide.

3. The tire according to claim 1, wherein the annular element is metallic.

4. The tire according to claim 3, wherein the bead reinforcement layers are formed of cables of aromatic polyamide.

5. A tire according to claim 1, wherein the layer of rubber mix arranged axially and radially to the outside of the bead and intended to provide the connection with the rim has a thickness of at most 2 millimeters, and the rubber mix has a modulus of elastic loss less than 1 MPa, the modulus of elastic loss being measured at 10% shear, at 50° C. and at a frequency of 10 Hz.

* * * * *